US006304168B1

United States Patent
Ohta et al.

(10) Patent No.: US 6,304,168 B1
(45) Date of Patent: Oct. 16, 2001

(54) DOOR APPROACH COMMUNICATION APPARATUS AND DOOR LOCK CONTROL APPARATUS

(75) Inventors: Takayuki Ohta; Toshimitsu Oka, both of Okazaki; Yuichi Murakami, Chiryu; Rikuo Hatano, Toyota; Kiyokazu Ieda, Chiryu, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/063,408

(22) Filed: Apr. 21, 1998

(30) Foreign Application Priority Data

Apr. 21, 1997 (JP) .................................................. 9-103009

(51) Int. Cl.$^7$ ...................................................... G06F 7/00
(52) U.S. Cl. ........................................... 340/5.72; 343/767
(58) Field of Search ..................... 340/825.31, 825.72, 340/5.72; 343/718, 711, 712, 713, 766, 767

(56) References Cited

U.S. PATENT DOCUMENTS

| | | | |
|---|---|---|---|
| 5,177,494 | * | 1/1993 | Dorrie et al. ........................ 343/711 |
| 5,319,364 | * | 6/1994 | Waraksa et al. ................. 340/825.72 |
| 5,532,705 | * | 7/1996 | Hama ................................... 343/718 |
| 5,942,985 | * | 7/1999 | Chin ................................ 340/825.31 |

FOREIGN PATENT DOCUMENTS

| | | |
|---|---|---|
| 60-119873 | 6/1995 | (JP) . |
| 9-22449 | 1/1997 | (JP) . |
| 9-32378 | 2/1997 | (JP) . |

* cited by examiner

Primary Examiner—Michael Horabik
Assistant Examiner—M Shimizu
(74) Attorney, Agent, or Firm—Burns, Doane, Swecker & Mathis, LLP

(57) ABSTRACT

A door approach transmission apparatus comprises an outside door handle 20 having a conductor with a slit 23 disposed in the door handle surface. A slot antenna 21, 23, 24, 25 is disposed at the slit 23, and includes feeding points 24, 25 installed on the conductor. The apparatus also includes a transmitter 26 for applying voltage for radio wave oscillation to the feeding points 24, 25. The above-described door approach transmission and reception apparatus can be used in a door lock control apparatus where a search radio wave is emitted from a vehicle, a portable wireless device 10 receives the search radio wave, and returns an ID signal. An electrically driven door lock apparatus 40 is driven to unlock the door when the returned ID signal coincides with a registered ID signal. The search radio wave is irradiated from the slot antenna. Either of a transmitter 26 and a receiver 33 is selectively connected to the feeding points 24, 25. By virtue of the above-described features, the emission and reception of radio waves is realized, and in the case of a door handle made of a metal, the number of parts for emission and reception of the radio waves are reduced.

20 Claims, 11 Drawing Sheets

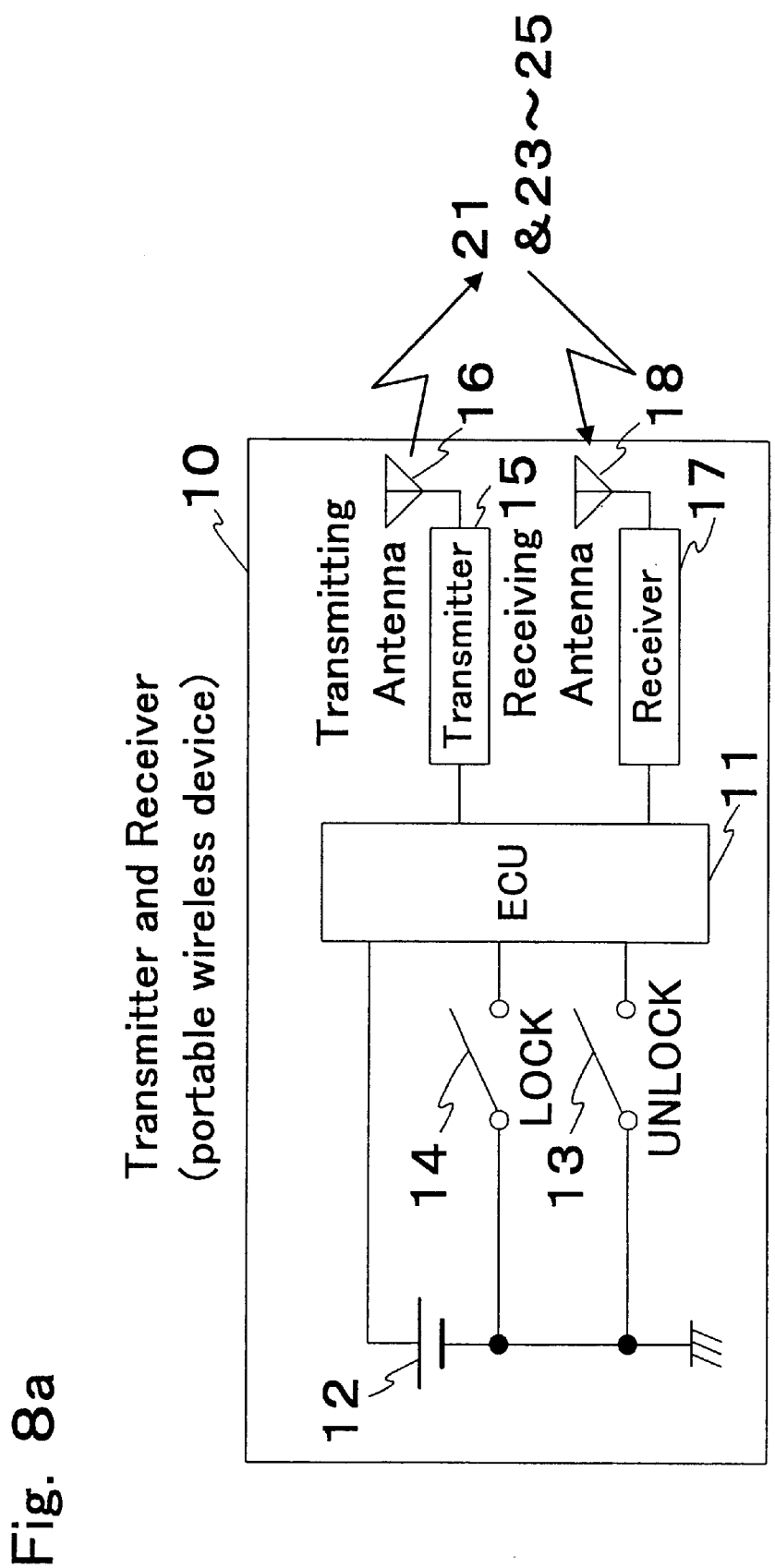

DOOR APPROACH COMMUNICATION APPARATUS AND DOOR LOCK CONTROL APPARATUS

This application corresponds to Japanese Patent Application No. 9-103009, filed on Apr. 21, 1997, which is incorporated by reference herein in its entirety.

BACKGROUND

1. Field of the Invention

According to exemplary and non-limiting embodiments, the present invention relates to a door approach communication apparatus for irradiating a searching radio wave in the vicinity of a vehicle door. The invention also relates to a wireless-type door lock control apparatus using the door approach communication apparatus. More particularly, the invention relates to an unlock transmitting apparatus provided with, in a vehicle having an electrically driven door lock device, an antenna, a transmitter, a receiver and a door lock controller. This apparatus irradiates a searching radio wave via the transmitter and the antenna and sends an unlock signal to the electrically driven lock device when the receiver decodes an unlock signal. The apparatus employs a search and answer style of interrogation in which, when the searching radio wave is received by a portable wireless device held by a driver, an unlock signal radio wave is transmitted therefrom.

2. Description of Related Art

Transmitting apparatus for automatically unlocking the doors of vehicles are generally referred to as keyless entry systems. According to the keyless entry system disclosed in Japanese Unexamined Patent Publication No. 60-119873 and Japanese Unexamined Patent Publication No. 9-22429, a receiver located on a vehicle and a loop antenna for communicating with a portable wireless transmitter held by a driver are used. The loop antenna is formed by a conductive print pattern at a peripheral edge portion of a door mirror or on the surface of a door window.

According to the keyless entry system disclosed in Japanese Unexamined Patent Publication No. 9-32378, an antenna is installed in the vicinity or at the inside of an outside door handle. In this case, a receiving region is constituted by an area in the vicinity of the driver's seat door.

According to the above example of using a loop antenna, an antenna (coil) is mounted to a part located on the vehicle, such as by embedding an antenna coil inside a door mirror or pasting an antenna on the surface of a door window. Accordingly, the cost of implementing this apparatus may increase. Further, the parts used in implementing this apparatus may be large in size, and the characteristic of the antenna is liable to suffer influence from the surrounding parts. This design may also suffer from other drawbacks.

It may be less problematic to mount an antenna in the vicinity or inside an outside door handle when the outside door handle is made of resin. However, when the outside door handle is made of a metal (for example, made by zinc die-cast) as well as when a metal is coated on the surface of the resin, the function of the mounted antenna may be hampered.

SUMMARY

It is a first object of the present invention to provide emission of radio waves from an outside door handle made of a conductor to a vicinity thereof, or reception of radio waves by the outside door handle.

It is a second object of the present invention to reduce the number of parts for the emission of the radio waves or for the reception of the radio waves.

According to one exemplary aspect of the present invention, there is provided a door approach communication apparatus comprising a slot antenna (21, 23, 24, 25) including an outside door handle (20) at least a surface of which is constituted by a conductor. A slit (23) is opened in the conductor and feeding points (24, 25) are provided to the conductor. A transmitter (26) is also provided for applying a voltage for radio wave oscillation to the feeding points.

According to another exemplary aspect of the present invention, there is provided a door approach communication apparatus comprising a slot antenna (21, 23, 24, 25) including an outside door handle (20) at least a surface of which is constituted by a conductor. A slit (23) is opened at the conductor and feeding points (24, 25) are provided to the conductor. Further, a receiver (33) is connected to the feeding points (24, 25).

According to these above-described apparatus, the outside door handle (20) per se is used also for the conductor plate of the slot antenna, and accordingly, the parts for achieving the antenna function are the slit (23) and the feeding points (24, 25). This aspect of the invention thus reduces the number of parts required.

Further, the outside door handle (20) is provided with a limited size and, in one embodiment, does not comprise a complete plane. Accordingly, this design significantly differs from an ideal (theoretical) slot antenna and the antenna characteristic may be considerably lower than a theoretical characteristic. However, an effective radio wave is irradiated in a range of a short distance in the vicinity of the vehicle door. Further, a radio wave is effectively received in a range of a short distance in the vicinity of the door.

Particularly, when the apparatus are used in the above-described keyless entry system, the apparatus provide sufficient performance for the emission or reception of radio waves, wherein the effective range of the radio waves comprises a radius of about 1 m or about 2 m from the door at a driver's seat in a vehicle. Accordingly, a significantly large electric field for the radio wave is not needed.

When the main body of the outside door handle (20) is made of a die-cast metal (for example, made of zinc die-cast) or synthetic resin plated with an ornamental metal on its surface, one embodiment of the invention comprises forming a cut or a slit for a slot antenna. Open screw holes are provided to receive a couple of feeding points at the central portion of the slit in the longitudinal direction before plating a metal onto the device. The slit and the holes for the feeding points (e.g., bottomed holes on the rear face) may be formed in a die for casting or in an injection-molding process. In this fabrication method, the main body of the device can be formed, and the slit and the holes for the feeding points may be formed in the course of fabricating the main body. Further, in one embodiment, the slit is sealed airtight by embedding the slit in a dielectric body, for example, synthetic resin. At any rate, a number of parts and a number of assembling steps for mounting an antenna may be reduced compared to the case of mounting a conventional antenna. Further, even with an outside door handle comprising an inner portion or a surface of which is made of a metal (e.g., a conductor), the antenna can be arranged (formed) at the conductive portion. In addition thereto, this design achieves an advantage in that the antenna is inconspicuous and it is therefore difficult for people to discern that the antenna is mounted on the door.

According to another exemplary aspect of the present invention, a door lock control apparatus is provided comprising a portable wireless device (10) used for transmitting a response radio wave when a search radio wave is received. On the side of the vehicle, an antenna (21, 23, 24, 25, 32), a transmitter (26), and a receiver (33) are also provided. Also, a door lock controller (31) is provided for emitting the search radio wave via the transmitter (26) and the antenna (21, 23, 24, 25, 32) and transmitting an unlock signal to an electrically driven door lock device (40) when the receiver (33) receives the response radio wave. The antenna (21, 23, 24, 25, 32) includes a slot antenna (21, 23, 24, 25) comprising a slit (23) opened at a conductor (e.g., such as a metal surface) provided at an outside door handle (20). The slot antenna also includes feeding points (24, 25) connected to the conductor.

The above-described embodiment of the keyless entry system shares at least the same benefits in operation and effect as described above.

According to another aspect of the present invention, there is provided a door lock control apparatus comprising a portable wireless device (10) including an antenna (18) for receiving a search radio wave, a receiver (17) connected to the antenna for decoding a request signal carried by the search radio wave, a controller (11) for generating a return signal in response to the request signal and a transmitter (15) and a transmitting antenna (16) for transmitting a return radio wave produced by modulating a carrier wave by the return signal. A slot antenna (21 and 23–25) is provided which is disposed on a vehicle. This slot antenna comprises a slit (23) opened at a conductor of an outside door handle (20) at least a surface of which is constituted by the conductor, and feeding points (24, 25) provided on the conductor (21). A transmitter (26) is disposed on the vehicle for applying the search radio wave produced by modulating a carrier wave by the request signal to the slot antenna (21 and 23, 24. 25). A receiving antenna (32) is disposed on the vehicle for receiving the return radio wave irradiated by the transmitting antenna (16) of the portable wireless device (10). A receiver (33) is disposed on the vehicle and is connected to the receiving antenna (32) on the vehicle for decoding a return signal carried by the return radio wave. A door lock controller (31) is also provided on the vehicle for transmitting the request signal to the transmitter (26) on the vehicle and transmitting an unlock signal to an electrically driven door lock device (40) on the vehicle in response to the return signal when the receiver (33) on the vehicle decodes the return signal.

In another aspect of the present invention, a search distance capable of transmitting and receiving a radio wave in a search radio wave transmitting and receiving system comprising a search radio wave transmitting system comprising the transmitter (26) and the slot antenna (21 and 23, 24, 25) on the vehicle and a search radio wave receiving system comprising the receiving antenna (18) and the receiver (17) of the portable wireless device (16), is short (e.g., about 1–2 meters). On the other hand, the distance capable of transmitting and receiving the radio wave in a return radio wave transmitting and receiving system comprising a return signal transmitting system comprising the transmitter (15) and the transmitting antenna (16) of the portable wireless device (10) and a return signal receiving system comprising the receiving antenna (32) and the receiver (33) on the vehicle, is longer than the search distance (e.g., about 5 meters or more).

In another aspect of the present invention, the door lock controller (31) on the vehicle transmits the request signal to the transmitter (26) on the vehicle at a predetermined period.

According to another aspect of the present invention, there is provided a door lock control apparatus (e.g., corresponding to the Second Embodiment of FIG. 8) comprising a portable wireless device (10) including an antenna (18) for receiving a search radio wave, a receiver (17) connected to the antenna for decoding a request signal carried by the search radio wave, a controller (11) for generating a return signal in response to the request signal and a transmitter (15) and a transmitting antenna (16) for transmitting a return radio wave produced by modulating a carrier wave by the return signal. A slot antenna (21 and 23, 24, 25) is disposed on a vehicle and comprises a slit (23) opened at a conductor (21) of an outside door handle (20) at least a surface of which is constituted by the conductor. Feeding points (24, 25) are provided which are connectively associated with the conductor. A transmitter (26) is disposed on the vehicle for applying a signal of the search radio wave produced by modulating a carrier by the request signal to the slot antenna (21 and 23, 24, 25). A receiver (33) is disposed on the vehicle for decoding a return signal carried by the return radio wave irradiated by the transmitting antenna (16) of the portable wireless device (10). Selectively connecting means (SS) is provided for selectively connecting either of the transmitter (26) and the receiver (33) on the vehicle to the slot antenna (21 and 23, 24, 25). An unlock signal is transmitted to an electrically driven door lock device (40) on the vehicle in response to the return signal when the selectively connecting means (SS) connects the transmitter (26) on the vehicle to the slot antenna by which the request signal is transmitted to the transmitter (26) on the vehicle and the selectively connecting means (SS) connects the receiver (33) on the vehicle to the slot antenna by which the receiver (33) on the vehicle decodes the return signal.

In the above-described embodiment, the door lock controller (31) on the vehicle transmits the request signal to the transmitter (26) on the vehicle at a predetermined period.

BRIEF DESCRIPTION OF THE DRAWINGS

The foregoing, and other, objects, features and advantages of the present invention will be more readily understood upon reading the following detailed description in conjunction with the drawings in which:

FIGS. 2A and 2B show an outside door handle 20 equipped with a slot antenna (21, 23, 24 and 25) for transmission in the apparatus illustrated in FIG. 1, in which FIG. 2A is a front view and FIG. 2B is a vertical cross-sectional view;

FIGS. 6A, 6B and 6C are graphs showing directivity characteristics of a slot antenna, in which FIG. 6A shows the directivity characteristic on a horizontal plane, FIG. 6B shows the directivity characteristic on a vertical plane and FIG. 6C shows the directivity characteristic on a plane of polarization;

FIGS. 8a and 8b are block diagrams showing the constitution of a door lock control apparatus according to a second exemplary embodiment of the present invention.

DETAILED DESCRIPTION OF THE PREFERRED EMBODIMENTS

First Embodiment

Figure 1A:
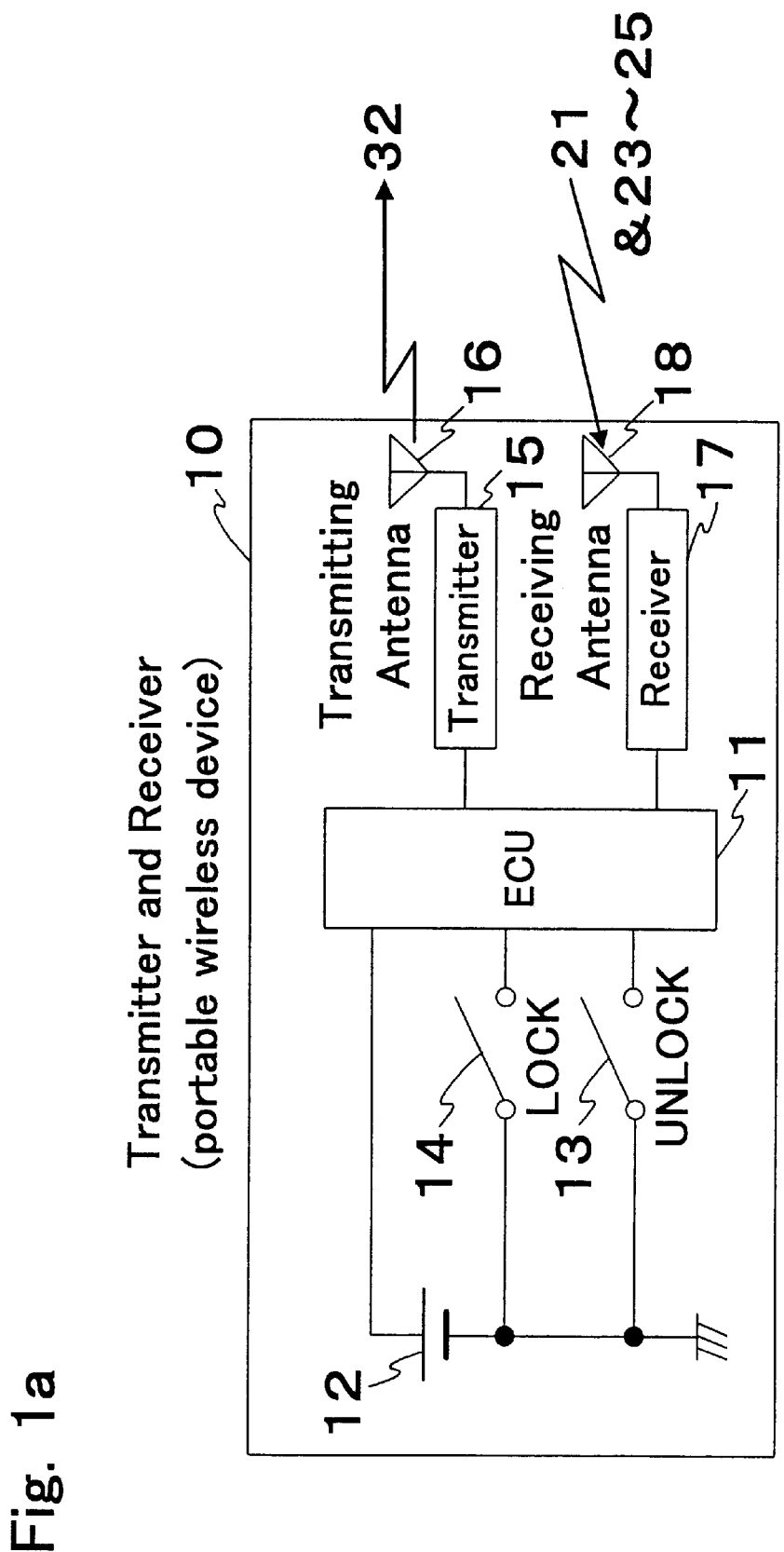
FIGS. 1a and 1b are block diagrams showing the exemplary constitution of a door lock control apparatus according to a first embodiment of the present invention.
Figure 1B:
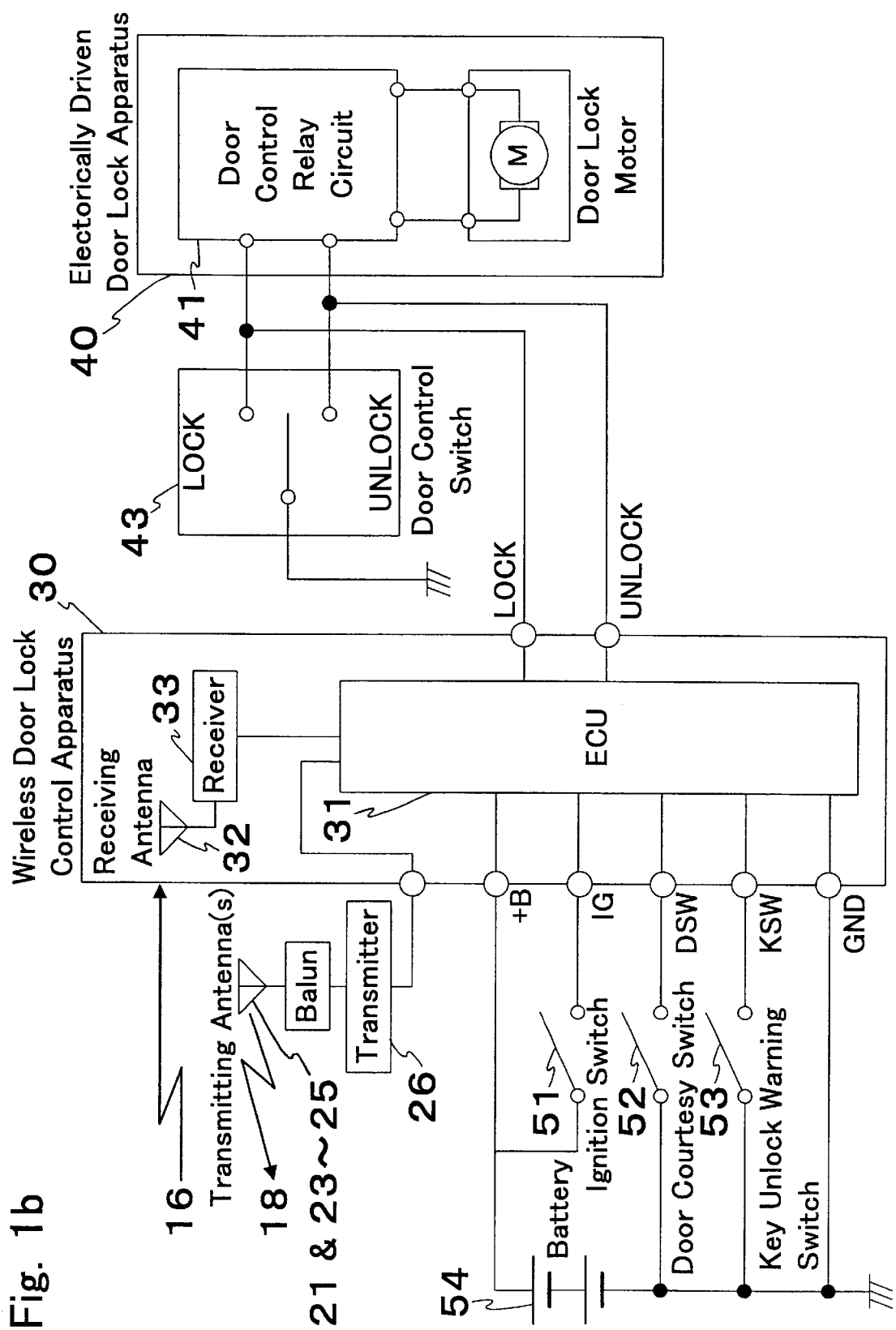

FIGS. 1a and 1b show the constitution of an exemplary keyless entry system according to a first embodiment of the present invention. An electrically driven door lock apparatus 40 and a door control switch 43 are connectively associated with a driver's seat door in a vehicle. Further, the electrically driven door lock apparatus 40 is connected to an electronic control unit (ECU) 31, wherein the ECU 31 includes a CPU and input and output electronic circuits for use in a wireless door lock control apparatus 30 provided in the vehicle. ECU 31 is connected to a transmitter 26, a receiver 33, an ignition switch 51, a door courtesy switch 52 and a key unlock warning switch 53. In one embodiment, a receiving antenna 32 is provided which comprises a coil type antenna built into the wireless door lock control apparatus 30.

The ignition switch 51 is closed (in an ON state) when an engine key is set at an ignition position (that is, an engine operating position), and is opened (in an OFF state) when the engine key is set at another position. The signal IG represents the state of the switch 51. This signal is transmitted to ECU 31.

The door courtesy switch 52 is closed (in an ON state) when a driver's seat door is opened, and is opened (in an OFF state) when the door is closed. The signal DSW represents the state of switch 52. This signal is transmitted to ECU 31.

The key unlock warning switch 53 is closed (in an ON state) when the engine key is inserted into an engine key cylinder and at a lock position. The key unlock warning switch 53 is opened (in an OFF state) when the key is not inserted into the key cylinder or when the key is at the unlock position. The signal KSW represents the state of the switch 53. This signal is transmitted to ECU 31.

ECU 31 is provided with an operation power source circuit which applies operating voltage to all of the elements on a control board of the control apparatus 30. A standby power source circuit applies operating voltage only to the CPU in ECU 31. The CPU controls the ON state (in which the operating voltage is output) and the OFF state (in which the power source is turned OFF) of the operation power source circuit. The operation of the CPU in turning the operation power source circuit on is referred to as a "WAKE UP" operation, and the operation of the CPU in turning the operation power source circuit off is referred to as a "SLEEP" operation.

Figure 2A:
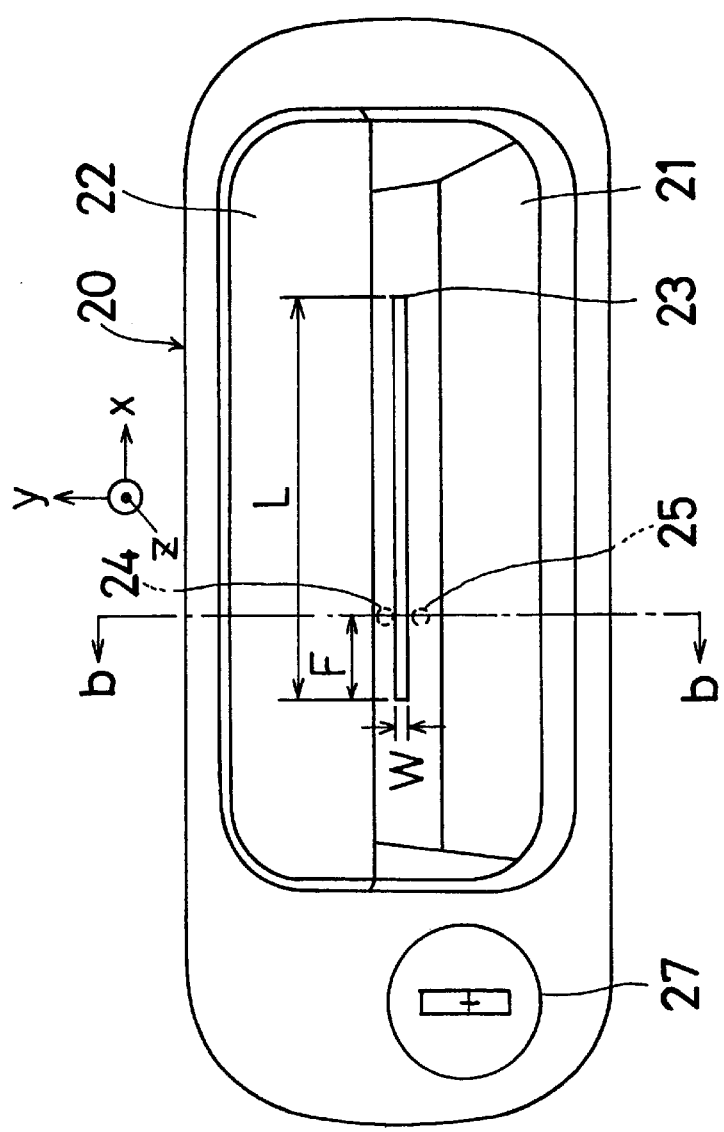
Figure 2B:
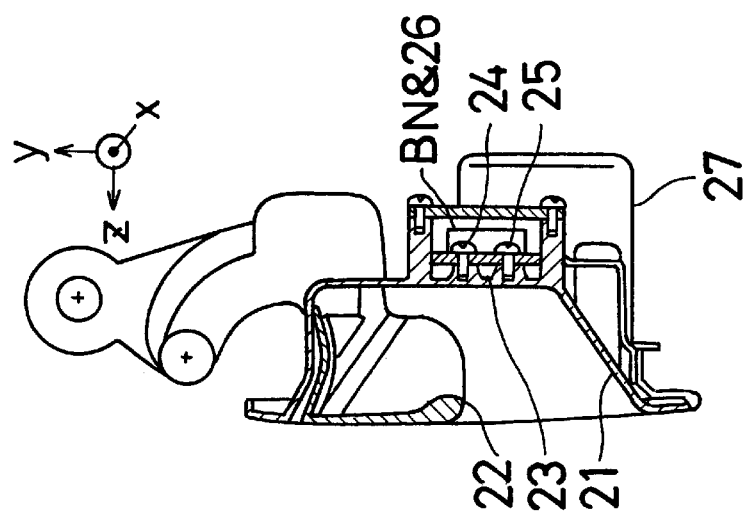

An explanation will now be given of the exemplary structure of the transmitting antenna (e.g., see reference numbers 21, 23, 24 and 25 of FIGS. 1a, 2A and 2B). The transmitting antenna is connected to the transmitter 26. With reference particularly to FIGS. 2A and 2B, an outside door handle 20, which is mounted to the driver's side door, is plated with an ornamental metal of zinc die-cast (cast zinc), or other material, at its surface. The door handle 20 comprises a base plate portion 21 mounted to a key cylinder 27.

A door knob 22 is mounted to the base plate portion 21 such that it can be pivoted in an outward direction when grasped by a user. FIG. 2A shows an outer surface of the door handle 20 and FIG. 2B shows a vertical cross-sectional face thereof. As shown by FIG. 2B, the base plate portion 21 has a shape which extends into the interior of the door. Within the interior of the door, the base plate portion 21 defines a substantially vertical face. At the upper end side, the vertical face is bent substantially orthogonally. From this point, the base plate portion 21 projects outward toward the outside surface of the door, and is then bent in an upward direction. This structure generally defines a U-shape which allows the user's hand to be securely received in the cavity enclosed by the base plate portion 21. A slit 23 for a slot antenna is cut at a bottom face portion of the above-described vertical face portion of the base plate portion 21. Synthetic resin is embedded in the slit 23 and, according to one exemplary embodiment, the slit is closed off by the synthetic resin.

In a step of casting the door handle 20, on the rear side of the bottom face portion, a pair of base seats for screw holes are provided. Each of the base seats has a truncated cone shape and is integrally formed with the base plate portion 21. The base seats are separated from each other by a small distance in the vertical direction, and the slit 23 is cut in the base plate portion 21 to cross horizontally at an intermediate point between these base seats. In one embodiment (not shown), a mid-point in a length of the slit in the horizontal direction coincides with the position of the base seats in the horizontal direction.

After finishing the casting step, screw holes (bottomed screw holes) are opened in each base seat, and a balun BN (FIG. 1b) is connected to screws 24 and 25 which are screwed into the screw holes. The transmitter 26 is then connected to the balun BN via a coaxial cable. In order to reduce transmission power loss and disturbance noise, as shown by FIG. 2B, the balun BN and the transmitter 26 are mounted to the base plate portion 21 of the door handle 20. A conductive plate and the screws 24 and 25 of the slot antenna where the base plate portion of the door handle 20 is connected to the transmitter 26, constitute feeding points. The balun BN is connected to the feeding points and the transmitter 26 is connected to the balun BN. The balun BN is installed for restraining leakage current which may flow to the outside of an externally covered conductor of the coaxial cable, and for subjecting the slot antenna to balanced excitation.

In this exemplary embodiment, a length L of the slit 23 shown in FIG. 2A is approximately 68 mm and a width w thereof is approximately 0.5 mm. The feeding method comprises a system which uses the balun BN for converting an unbalance of 50 $\Omega$ into a balanced state. Accordingly, feeding is carried out by offsetting the feeding points (24, 25) to a point F (FIG. 2A) which can provide matching to the 50 $\Omega$ system, rather than by disposing the feeding points at the center of the slit 23 in the longitudinal direction (L). A distance between point F and an end of the slit 23 is approximately 10.8 mm in this exemplary embodiment.

Figure 6A:
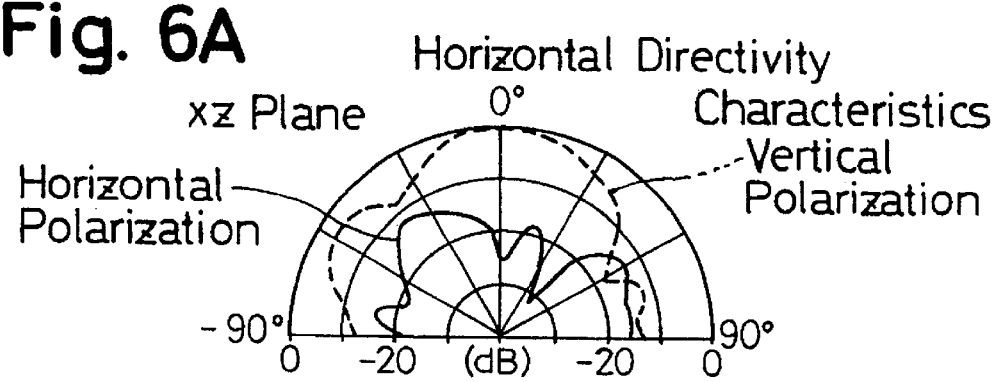
Figure 6B:
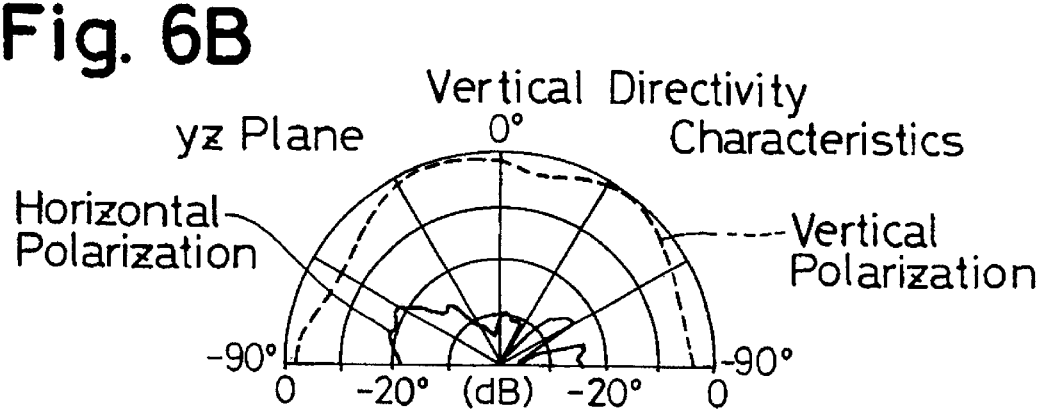
Figure 6C:
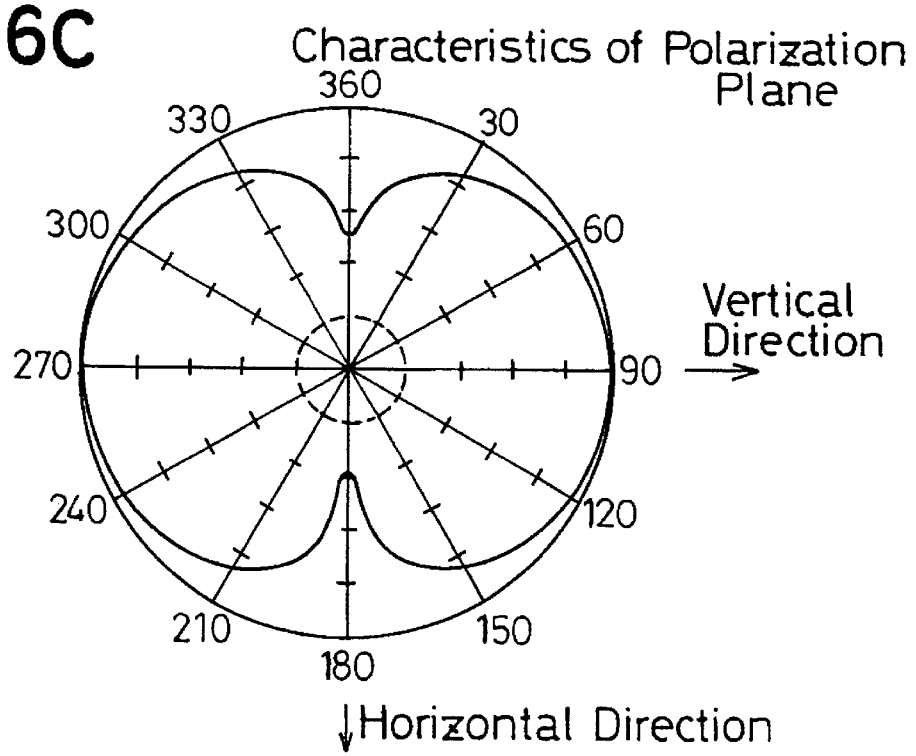

The directivity characteristic of a horizontal plane of the slot antenna is illustrated in FIG. 6A. The directivity characteristic of a vertical plane is illustrated in FIG. 6B, and the characteristic of a plane of polarization is illustrated in FIG. 6C. The gain dipole ratio is approximately −0.95 and the impedance is approximately 42 $\Omega$. The frequency of the slot antenna is several GHz in this exemplary embodiment.

Refer again to FIGS. 1a and 1b. As shown there, a very small-sized transmitter and receiver 10 unit (comprising a portable wireless device) is integrated with a key holder attached to an engine key, which is carried by a driver. The transmitter and receiver 10 comprises a so-called remote controller for transmission and reception of electromagnetic signals. This unit includes an electronic control unit (ECU) 11 including a CPU and input and output circuits, a battery 12 for providing a power source, a key switch 13 for providing an instruction to unlock the vehicle door, a key switch 14 for providing an instruction to lock the vehicle door, a transmitter 15, a transmitting antenna 16, a receiver 17 and a receiving antenna 18.

ECU 11 is provided with an operation power source circuit for applying operating voltage to all of the elements of the transmitter and receiver 10, and a standby power source circuit for applying operating voltage to the CPU of the ECU 11 and the receiver 17. The CPU of the ECU 11 controls an ON state (in which operating voltage is output) and an OFF state (in which the power source is turned OFF) of the operation power source circuit. An operation of the CPU in which the operation power source circuit is turned on is referred to as a "WAKE UP" operation, while an operation in which the operation power source circuit is turned off is referred to as a "STANDBY" operation.

According to the above-described exemplary embodiment, a search radio wave transmitting system can be defined as the transmitter 26 and the slot antenna (21, 23, 24, 25) on the vehicle, while a search radio wave receiving system can be defined as the antenna 18 and the receiver 17 of the transmitter and receiver 10. The distance between the search radio wave transmitting system and the search radio wave receiving system is short (e.g., about several meters). A return signal transmitting system can be defined as the transmitter 15 and the antenna 16 of the transmitter and receiver 10, while a return signal receiving system can be defined as the receiving antenna 32 and the receiver 33 on the vehicle. The distance between the return signal radio wave transmitting system and the return signal radio wave receiving system is longer than the above search distance (e.g., about 10 m or more).

Accordingly, power consumption of the return signal radio wave transmitting and receiving system (transmitter 15, receiver 33) may be considerable. Therefore, electricity is fed to the system from the operation power source circuit so that power consumption during STANDBY operation is reduced. Further, as mentioned later, when parking the vehicle, the search radio wave is transmitted by the transmitter 26 and the slot antenna (21, 23, 24, 25) substantially at a period defined by T4+T0. During the period of T4, the operating voltage is applied to the transmitter 26 and the receiver 33, and the operating voltage is interrupted at other time periods, so that power consumption during STANDBY operation is reduced. According to one exemplary embodiment, time limit values T0, T1, T2 and T3, discussed in greater detail later, are respectively: T0 is approximately 180 msec; T1 is approximately 30 sec; T2 is approximately 2 sec; T3 is approximately 5 sec; and T4 is approximately 30 sec.

Figure 3A:
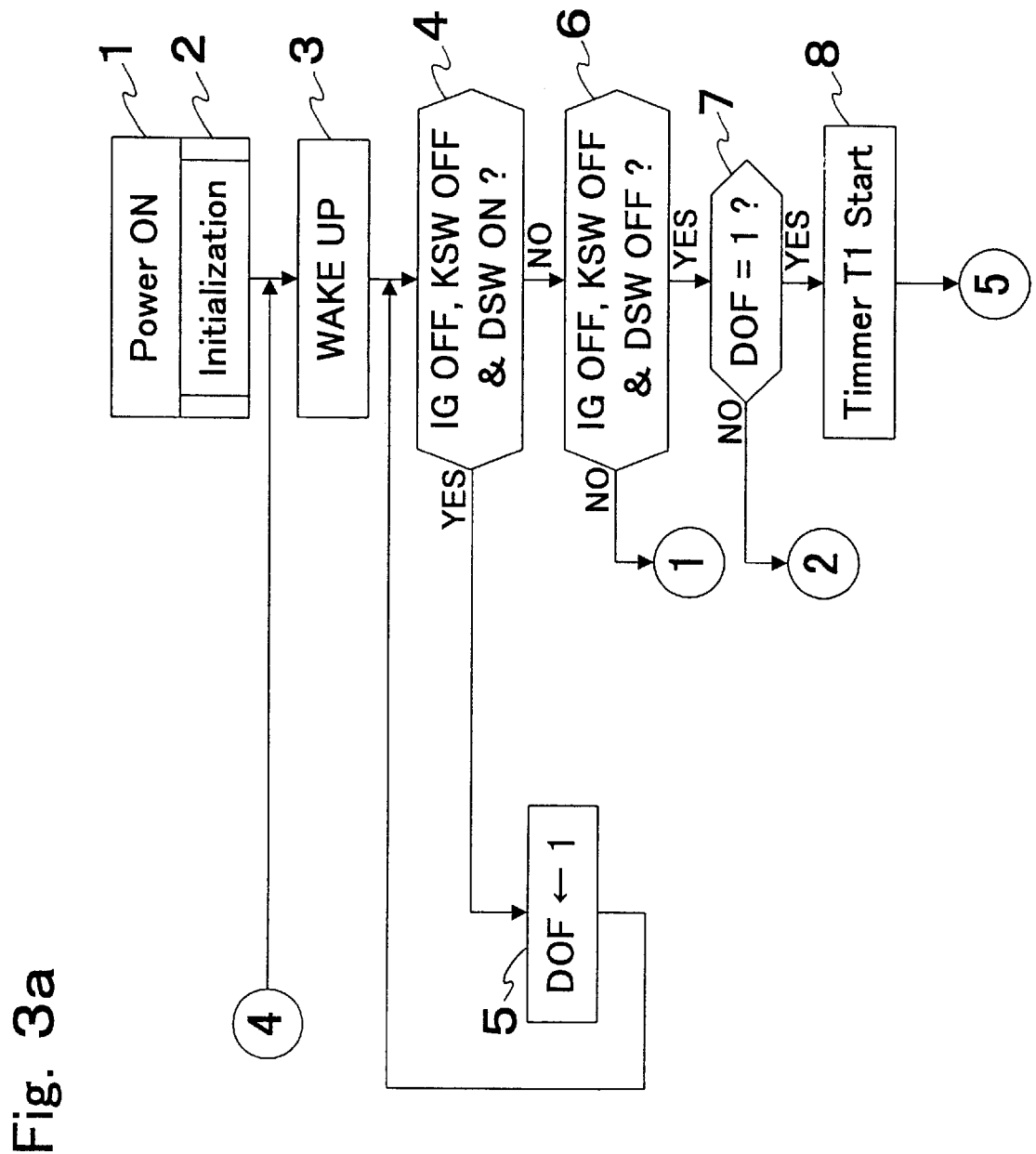
FIGS. 3a and 3b illustrate a flowchart showing a part of a communication control operation of a CPU in the ECU 31 illustrated in FIG. 1.
Figure 3B:
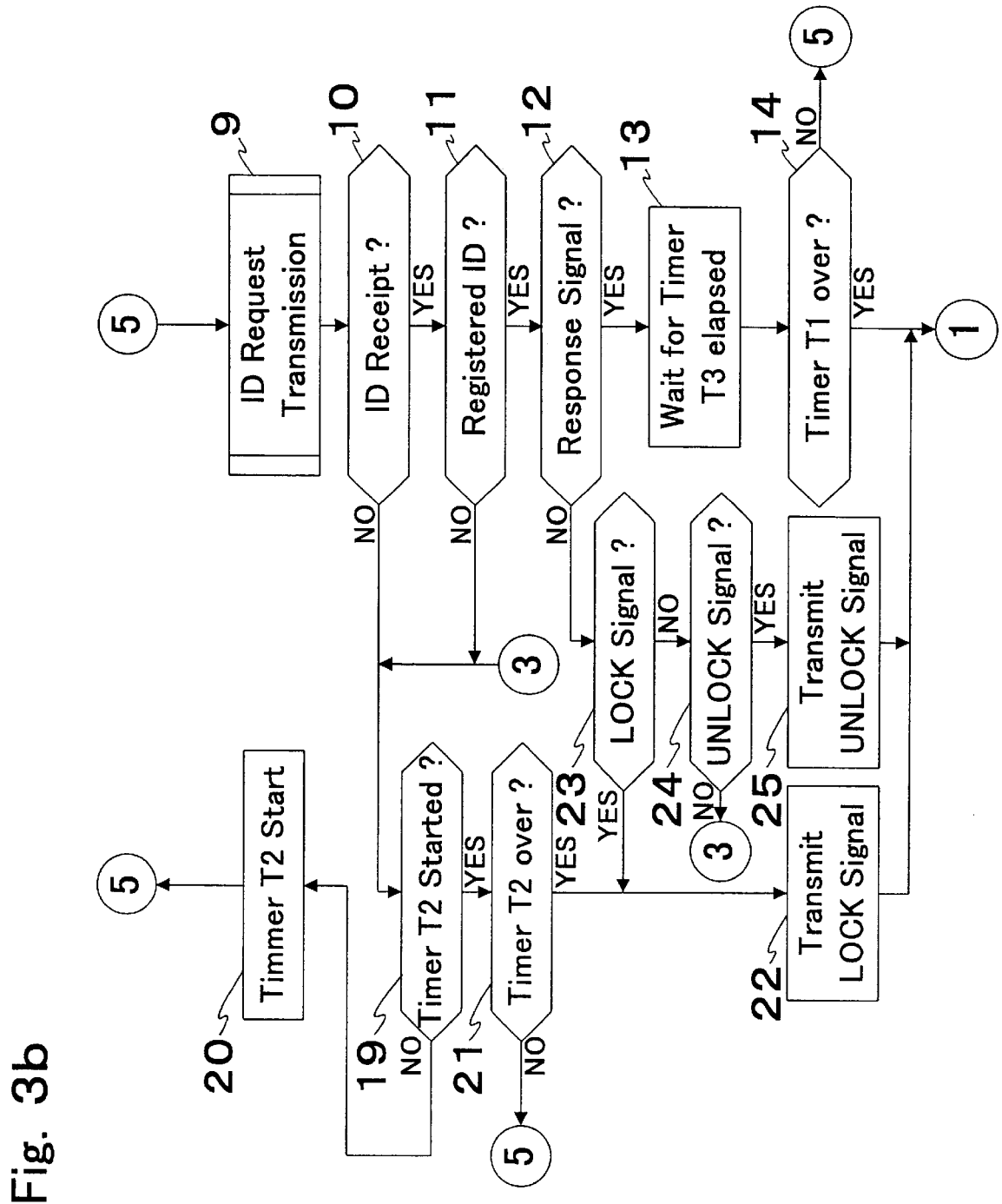
Figure 4:
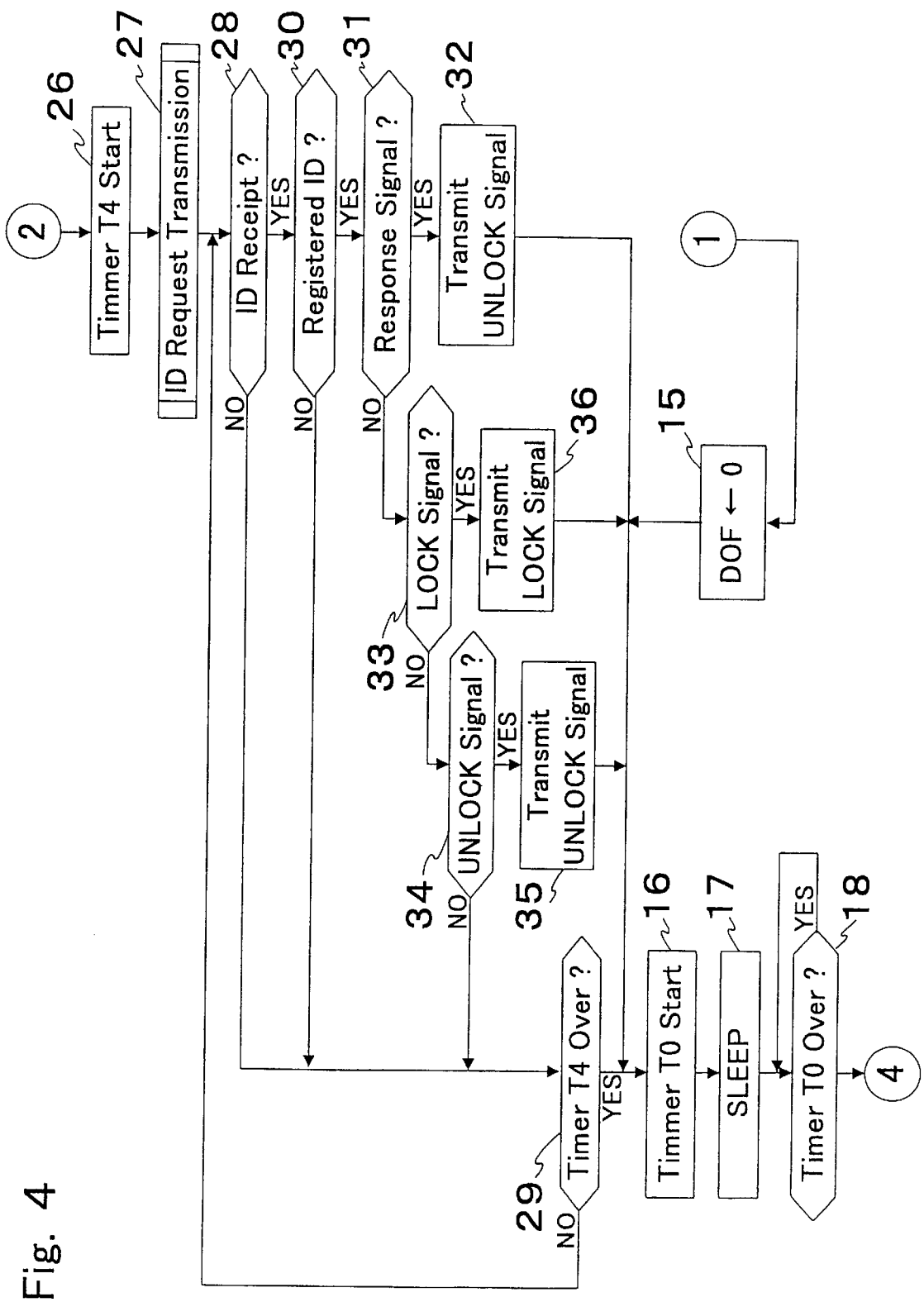
FIG. 4 is a flowchart showing a remaining part of the communication control operation of the CPU in the ECU 31 illustrated in FIG. 1.

FIGS. 3a, 3b and 4 show the exemplary control operation of the CPU within the ECU 31 in the wireless door lock control apparatus 30. First, refer to FIGS. 3a and 3b. When the wireless door lock control apparatus 30 is connected to a battery 54 in the vehicle, the standby power source circuit within the ECU 31 applies the operating voltage to the CPU within the ECU 31 (step 1), and the CPU carries out a resetting operation (reset power source to its ON state) (step 2). (In the following description, only the step numbers, without the word "step", are provided).

Next, the CPU in the ECU 31 turns on the operation power source circuit within the ECU 31 (3). Thereby, the wireless door lock control apparatus 30 can carry out transmission and reception. Next, the CPU reads the signals IG, DSW and KSW which indicate the status of the switches 51 through 53. More specifically, in step (4), the system checks whether the vehicle is stopped (e.g., the engine is stopped) (IG is in its OFF state), whether the engine key is removed from the engine key cylinder (KSW is in its OFF state), and whether the driver's seat door is opened (DSW is in its ON state). These checking operations indirectly detect whether the driver gets off (e.g., gets out of) the vehicle. Further, when the results of the above-described checking are positive (YES), the CPU writes "1" (indicating that the door is open, e.g., signifying that the driver is getting out of the vehicle) to a register. This register is provided in one region of the inner memory of CPU (5). And when the door at the driver's seat is closed (e.g., the DSW signal is in its OFF state), the CPU recognizes this at step (6) and checks whether "1" is present at the register DOF (7).

When "1" is present in the register DOF, at this stage, the driver is considered as having stepped out of the vehicle and closed the door at the driver's seat (e.g., the driver has finished getting out of the vehicle). At this point, the CPU starts a timer T1 having the time limit of T1 (step 8). The CPU also transmits a signal requesting an ID (identification code) to the transmitter 26. The transmitter 26 modulates a carrier wave with the ID request signal and applies a voltage signal representative of the modulated wave to the feeding points 24 and 25 of the transmitting antenna. Thereby, a radio wave carrying the ID request signal is emitted from the slit 23 portion to a region outside of the vehicle (9).

As mentioned, the CPU within the ECU 11 of the transmitter and receiver 10 may be integrated with the engine key holder carried by the driver. The operational steps performed by the CPU within the ECU 11 are described with reference to FIG. 5. The CPU within ECU 11 generally turns the operation power source circuit off in the standby mode of operation. However, in this mode, the standby power source circuit applies operating voltage to circuits except the transmitter 15, such that the receiver 17 can operate. When the receiver 17 receives the radio wave carrying the ID request signal, the receiver 17 decodes the ID request signal from the received radio wave and transmits it to the CPU within the ECU 11. The CPU then turns on the operation power source circuit in response to the ID request signal (44–45) and transmits an ID identifying itself (which is stored in an inner memory) to the transmitter 15 in addition to a response signal. The transmitter 15 modulates a carrier wave by this ID signal and the response signal and applies the voltage signal of the modulated wave to the transmitting antenna 16 (46). Thereby, a radio wave carrying the ID signal and the response signal is emitted from the transmitting antenna 16. The abovementioned explanation is applicable to the case where, even when the driver (who is carrying a key) gets out of his or her respective vehicle, the driver is at a proximate distance in which the transmitter and receiver 10 can receive a radio wave emitted from the slit 23.

Returning now to the flowchart shown in FIGS. 3a and 3b, when the radio wave emitted from the transmitting antenna 16 is received by the antenna 32 and the receiver 33 of the wireless door lock control apparatus 30, the receiver 33 decodes the ID signal and the response signal and transmits it to the CPU within the ECU 31. The CPU within the ECU 31 checks whether the received ID signal coincides with an ID (e.g., a registered ID) stored in the CPU of the ECU 31 (step 10 in FIG. 3b). When the received and stored ID signals coincide with each other, the CPU checks whether the response signal is included within the received signal (12). When the response signal is present, the CPU waits an elapse of a time period of T3, and when that time has elapsed, the CPU checks whether the time period set by the timer T1 is over (13). When the time T1 is not over, the CPU re-transmits the ID request (9). During the time period T1 in which the transmitter and receiver unit 10 can return its ID signal and the response signal in response to the ID request, steps 9 through 13 are repeated substantially at a time period of T3.

Further, when the time period set by the timer T1 is over after the abovedescribed process of repetition, the CPU recognizes this at step 14. The CPU then clears the register DOF at step 15 of FIG. 4, starts the timer T0 for setting a search period having a time period of T0 (16) and turns OFF the operation power source circuit of the ECU 31. This operation is carried out for alleviating the burden (e.g., power drain) imposed on the battery 54 of the vehicle.

When at least one of the ID signal and the response signal is not returned, even if the ID request has been transmitted up until the time period set by the timer T1 is over (when driver leaves the vehicle), the CPU in ECU 31 starts a timer T2 having the time limit of T2 (e.g., see, generally, the steps shown on the lower right-hand side of FIG. 3b). When the time period set by the timer T2 is over, the CPU transmits a lock signal (lock instruction signal) to the electrically driven door lock apparatus 40 (21, 22), clears the register DOF (15 of FIG. 4), starts the timer T0 for setting the search period having the time period of T0 (16) and turns OFF the operation power source circuit of ECU 31 (17). The lock signal transmitted to the electrically driven door lock apparatus 40 closes (e.g., turns on) a relay of a forward rotation drive electricity conduction circuit of a door control relay circuit 41 and accordingly, current in the forward rotation drive direction is conducted to a door lock motor 42. In response, the motor 42 is rotated in a forward direction and a lock mechanism inside the driver's side door is driven to a lock position.

Figure 5:
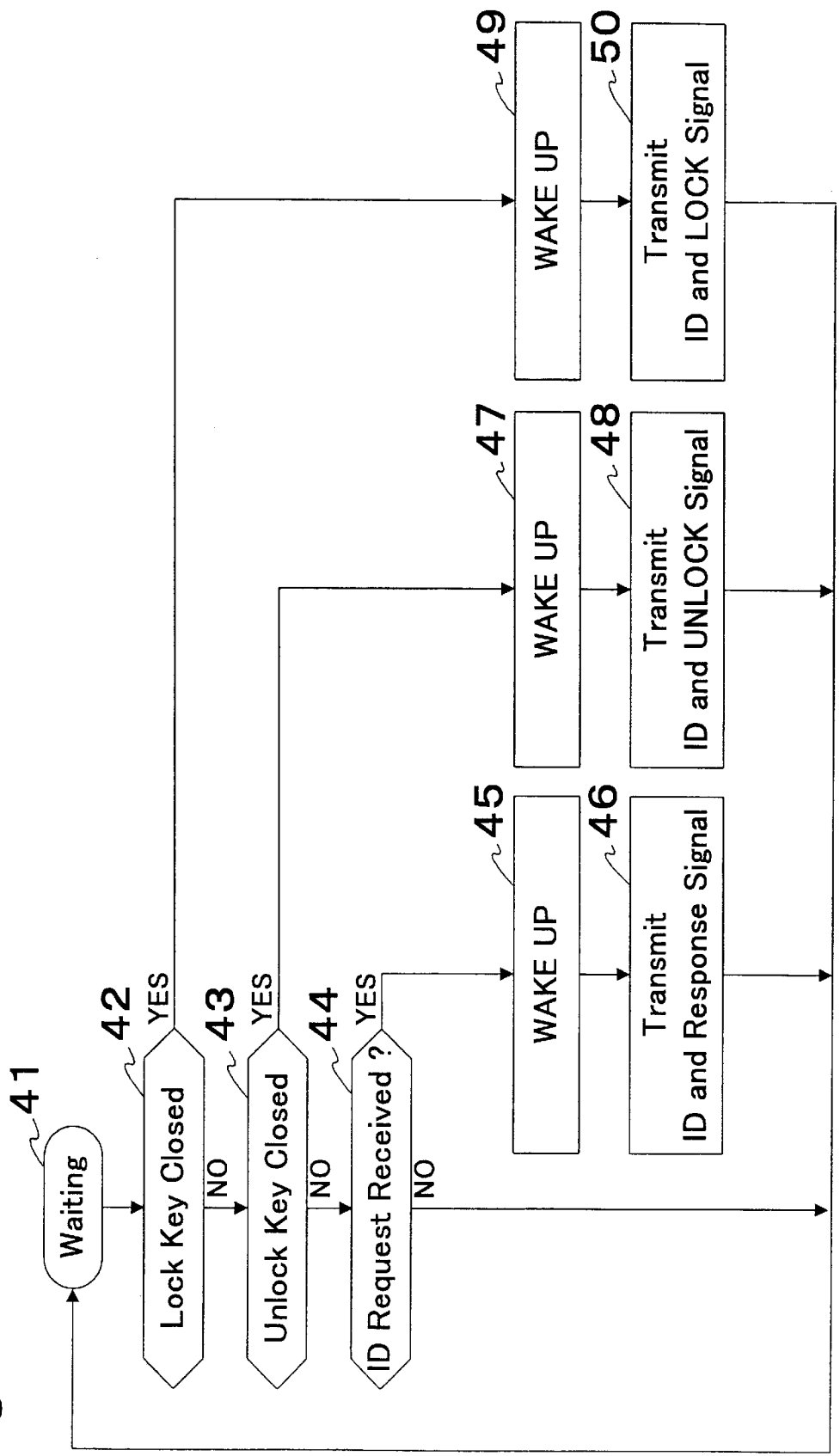
FIG. 5 is a flowchart showing a communication control operation of a CPU in the ECU 11 illustrated in FIG. 1.

Further, as shown by FIG. 5, the CPU in ECU 11 of the transmitter and receiver 10 turn on the operation power source circuit when the door unlock instruction key switch 13 is closed (to provide an ON state) (43–47), and, in response, transmits the ID stored in an inner memory of the transmitter 15 which identifies the unit 10, in addition to an unlock signal. The transmitter 15 modulates a carrier wave using the ID signal and the unlock signal and applies the voltage signals of the modulated wave to the transmitting antenna 16 (48). Thereby, the radio wave carrying the ID signal and the unlock signal is emitted from the transmitting antenna 16. Similarly, the CPU in ECU 11 of the transmitter and receiver 10 turns on the operation power source circuit when the door lock instruction key switch 14 is closed (to provide an ON state) (42–49), and, in response, transmits the ID stored in an inner memory of the transmitter 15, in addition to the lock signal. The transmitter 15 modulates a carrier wave using the ID signal and the lock signal and applies a voltage signal of the modulated wave to the transmitting antenna 16 (50). Thereby, a radio wave carrying the ID signal and the lock signal is emitted from the transmitting antenna 16.

As described above, when the CPU in ECU 31 transmits the ID request (9) and waits for the return signal from the transmitter and receiver 10, in the case where the driver turns on the unlock instruction key signal 13 of the engine key holder and the receiver 33 of the vehicle decodes the ID signal and the unlock signal, the CPU in the ECU 31 on the vehicle transmits the unlock signal to the electrically driven door lock apparatus 40 (25) via steps 10–12 and 23–24. When the door lock mechanism is disposed at the unlocked position at this moment in time, an unlock limit switch of the door lock mechanism, that is incorporated in a reverse rotation drive electricity conduction circuit of the door control relay circuit 41, is mechanically opened, and accordingly, even if a relay of the reverse rotation drive electricity conduction circuit is closed, the reverse rotation drive electricity conduction is not applied to the motor 42. When the door lock mechanism is disposed at the lock position, the motor 42 is rotated in reverse by the conduction of electricity and the door lock mechanism is driven to the unlocked position. After transmitting the unlock signal, the CPU in the ECU 31 clears the register DOF (15 of FIG. 4), starts the timer T0 for setting the search period having the time period of T0 (16), and then turns off the operation power source circuit of ECU 31 (17).

As described above, when the CPU in ECU 31 transmits the ID request (9) and waits for the return signal from the transmitter and receiver 10, in the case where a driver turns on the lock instruction key switch 14 and the receiver 33 decodes the ID signal and the lock signal, the CPU in the ECU 31 transmits the lock signal to the electrically driven door lock apparatus 40 (22) via steps 10, 11, 12 and 23. When the door lock mechanism is disposed at the lock position at this moment, the lock limit switch of the door lock mechanism incorporated in the forward rotation drive electricity conduction circuit of the door control relay circuit 41, is mechanically opened, and accordingly, even if a relay in the forward rotation drive electricity conduction circuit is closed, no forward rotation drive electricity conduction is applied to the motor 42. When the door lock mechanism is disposed at the unlocked position, the motor 42 is rotated forward by the conduction of electricity and the door lock mechanism is driven to the locked position. After transmitting the lock signal, the CPU in the ECU 51 clears the register DOF (15 of FIG. 4), starts the timer T0 for setting the search period having the time period of T0 (16), and turns off the operation power source circuit of the ECU 31 (17).

Refer again to FIG. 4. When the time period of T0 has elapsed after turning off the operation power source circuit as described above, the time period of the timer T0 expires. In response to the expiration of this time, the CPU in the ECU 31 turns on the operation power source circuit in the ECU 31 (18, 3). In this case, when the vehicle is parked, the driver is absent and the door at the driver's seat is in a locked state (e.g., all of the IG, KSW and DSW signals are in the OFF state). The CPU in the ECU 31 starts the timer T4 having a time limit of T4 at step 26 of FIG. 4 via steps 4, 6 and 7, and then transmits the ID request (27). The content of step 27 is the same as the content of step 9 which has already been explained. Next, the CPU in the ECU 31 waits for the return signal of the ID and the response signal from the transmitter and receiver 10 until a time period of the timer T4 is over (28, 29).

When the engine key holder equipped with the transmitter and receiver 10 (e.g., where the driver carries the engine key holder) is outside of an effective region of the radio wave (e.g., the region where the transmitter and receiver 10 can receive a signal having a sufficient level), the signals irradiated from the slot antenna (21, 23, 24, 25) comprising the ID request transmitted at step 27 are not received. Therefore, there is no return signal (ID and response signal) from the transmitter and receiver 10. In this case, when the time period of the timer T4 is over, the CPU in ECU 31 starts the timer T0 (16), turns off the operation power source circuit of ECU 31 (17) and waits for the expiration of time of the timer T0 (18). Further, when the time period of the timer T0 is over, the ID request is transmitted once again. Accordingly, a period of transmitting the ID request, that is, the search period where no return signal is received, is substantially T4+T0.

When the engine key holder equipped with the transmitter and receiver 10 (e.g., where the driver carries the engine key holder) is present within the effective region of the radio wave irradiated from the slot antenna (21, 23, 24 and 25), the ID request transmitted at step 27 is received by the transmitter and receiver 10. That is, the receiver 17 of the transmitter and receiver 10 decodes the ID request signal and transmits it to the CPU in the ECU 11. In response thereto, the CPU turns on the operation power source circuit of ECU 11 (44, 45 of FIG. 5) and transmits the ID signal and the response signal (46). When the receiver 33 decodes the ID signal and the response signal on the vehicle, the CPU in ECU 31 outputs an unlock signal to the electrically driven door lock apparatus 40 (32) via steps 28, 30 and 31 of FIG. 4. Then, the CPU starts the timer T0 (16), turns off the operation power source circuit of ECU 31 (17) and waits for the expiration of time of the timer T0 (18). In this case, the driver's seat door is unlocked and therefore, the driver carrying the engine key holder can enter the vehicle by opening the door at the driver's seat by drawing the door knob 22.

Further, in the case where during the time period of T4 where the CPU in ECU 31 has transmitted the ID request and is waiting for return signal (ID signal and response signal), the driver carrying the engine key holder (transmitter and receiver 10), can turn on the unlock instruction key switch 13 of the transmitter and receiver 10 within a region where transmission and reception can be carried out between the transmitter and receiver 10 and the receiving antenna 32 along with the receiver 33. In this case, the transmitter and receiver 10 transmits a radio wave carrying an ID signal and an unlock signal and the CPU in ECU 31 transmits the unlock signal to the electrically driven door lock apparatus 40 (35) via steps 28, 30, 31, 33 and 34. Accordingly, the door can be unlocked also when the driver operates the key switch.

Similarly, in the case where during the time period of T4 where the CPU in ECU 31 has transmitted the ID request and is awaiting for the return signal (ID signal and response signal), the driver carrying the engine key holder (transmitter and receiver 10) can turn on the lock instruction key switch 14 of the transmitter and receiver 10 within the region where transmission and reception can be carried out between the transmitter and receiver 10 and the receiving antenna 32 along with the receiver 33. In this case, the transmitter and receiver 10 transmits a radio wave carrying an ID signal and a lock signal and the CPU in ECU 31 transmits a lock signal to the electrically driven door lock apparatus 40 (36) via steps 28, 30, 31 and 33. Accordingly, the door can be locked also when the driver operates the key switch.

During a time period where the driver gets in the vehicle and closes the door at the driver's seat and the engine key is inserted into the engine key cylinder (e.g., indicating that the engine is now operating), the ignition key IG is set to its ON state, the door courtesy switch KSW is at its ON state and the key unlock warning switch DSW is at its OFF state. Accordingly, the CPU in ECU 31 clears the register DOF (15), starts the timer T0 (16), turns the operation power source circuit (17) off and waits for the expiration of time of the timer T0 (18). Further, when the time period of the timer T0 is over, the CPU turns on the operation power source circuit and the ignition switch IG is set to its ON state, the door courtesy switch KSW is at its ON state and the key unlock warning switch DSW is at its OFF state. Accordingly, when the CPU confirms these states of the switches, the CPU turns the operation power source circuit off (15 through 18). Accordingly, the CPU repeats the step of reading the signals IG, KSW and DSW at the period of T0, turns on the operation power source circuit only when signals are read and turns off the operation power source circuit at other time periods. Therefore, power consumption by the transmitter 26 and the receiver 33 is reduced to a small amount.

The door control switch 43 is installed in a vehicular compartment on the inner side of the driver's seat door. Therefore, the driver who is seated on the driver's seat can lock and unlock the door at the driver's seat by operating the switch 43. When the switch 43 is closed in its LOCK side state, if the door lock mechanism is in an unlocked state, the forward rotation drive electricity conduction circuit of the door control relay circuit 41 is closed, the door lock motor 40 is rotated in a forward direction by forward rotating electricity conduction and the door lock mechanism is disposed at a locked position. In the case where the driver closes the switch 43 to the UNLOCK state side, when the door lock mechanism is disposed at a locked position, the reverse rotation drive electricity conduction circuit of the door control relay circuit 41 is closed, the door lock motor 40 is reversely rotated by reverse rotation drive electricity conduction, and the door lock mechanism is disposed at an unlocked position.

When the driver draws the engine key, gets out of the vehicle and closes the door at the driver's seat, the CPU in the ECU 31 transmits the ID request (9) via steps 4 through 8. Operation thereafter has been already explained.

Figure 7A:
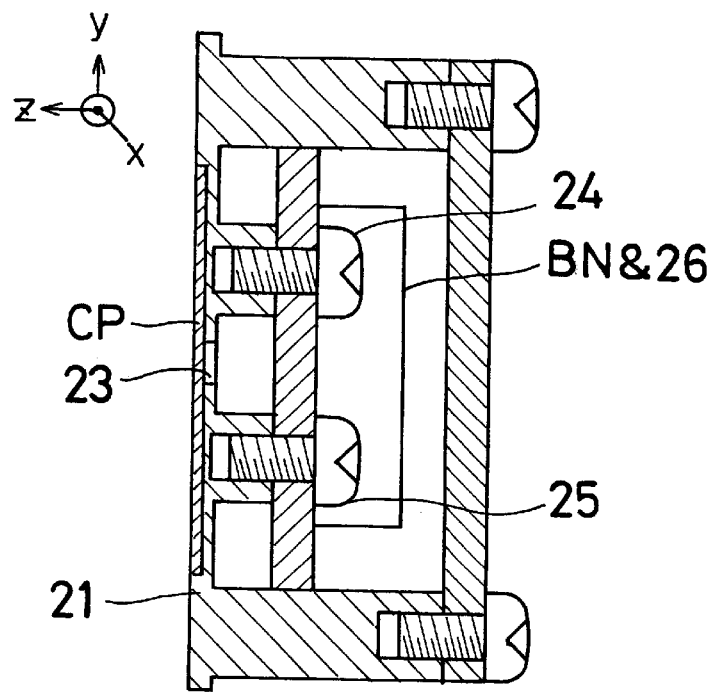
FIGS. 7A and 7B are enlarged sectional views showing modified examples of a portion of a slit 23 illustrated in FIG. 2B.
Figure 7B:
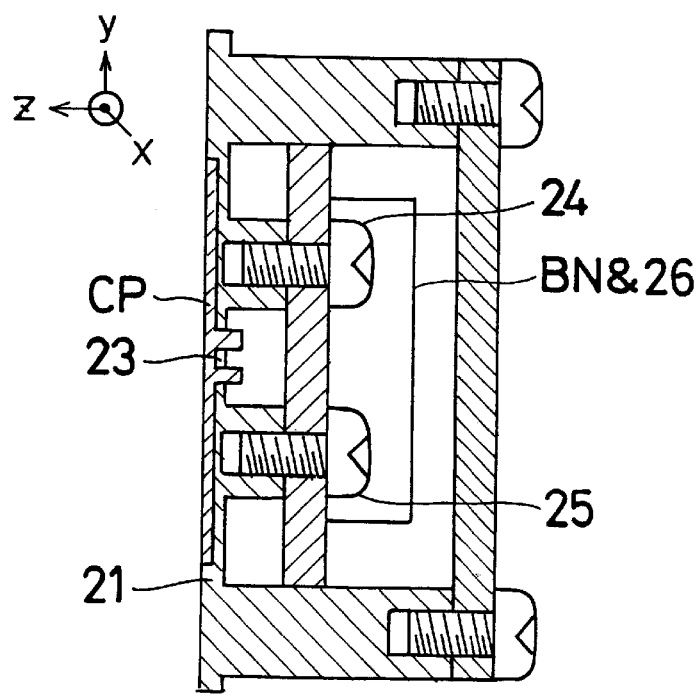

Although in the above-described embodiment, the slit 23 is closed by embedding synthetic resin in the slit 23 of the slot antenna, the slit 23 may be covered by pasting a dielectric body (for example, synthetic resin plate or like material) on the outer face of the base plate portion 21 of the door handle 20. This embodiment is illustrated in FIG. 7A. Notation CP designates a synthetic resin plate closing the slit 23 from its external surface. Further, as shown by FIG. 7B, the synthetic resin plate CP may be provided with claws which are inserted into the slit 21, and the synthetic resin plate CP may be brought into press contact with the base plate portion 21 by press-fitting the claws into the slit 23, so that the plate CP is locked into with base plate portion 21.

Further, although in the above-described embodiment, the transmitter and receiver 10 (remote controller) is assembled with the engine key holder, the transmitter and receiver 10 can be integrally attached to the engine key. Further, the transmitter and receiver 10 can be configured in other carriers capable of being transported with the driver when the driver gets out of and into the vehicle. For example, the transmitter and receiver 10 can be incorporated into a card-type of device, a sheet-type of device, a sheet cover type of device, a pocketbook or the like, all of which may be prepared separately from the engine key and the engine key holder.

Further, the above-described slot antenna can also be used as a receiving antenna. A second embodiment using the above-described slot antenna for transmission and reception is illustrated by FIGS. 8a and 8b.

Second Embodiment

Figure 8B:
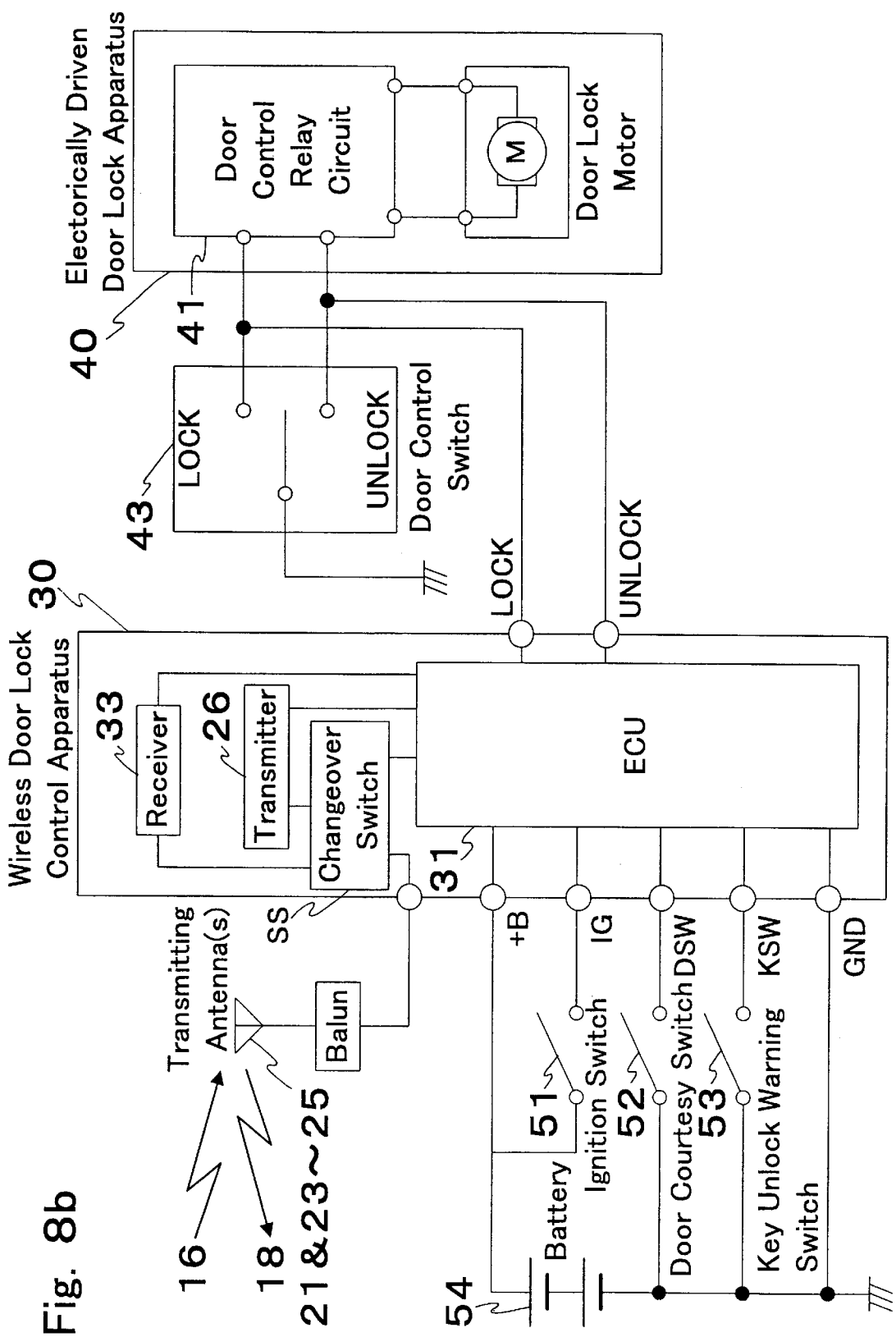

According to the second exemplary embodiment shown in FIGS. 8a and 8b, in the wireless door lock control apparatus 30, the receiving antenna 32 (FIG. 1) is removed, a changeover switch SS is added in place thereof and the changeover switch SS selects either of the transmitter 26 and the receiver 33 and connects the selected one to the balun BN. The selective connection of the transmitter 26 and the receiver 33 is controlled by the CPU in ECU 31. That is, the CPU in the ECU 31 normally sets the changeover switch SS to connect the balun BN with the receiver 33 and temporarily switches the changeover switch SS to connect between the balun BN and the transmitter 26 only when the step of "ID request transmission" is performed at steps 9 and 27 of FIG. 3*b* and FIG. 4. The constitution and function of other portions of FIGS. 8*a* and 8*b* are the same as those in the above-described first embodiment, and as such, a detailed description thereof will be omitted.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A door approach communication apparatus, comprising:
   an outside door handle functioning as a slot antenna, at least the surface of the outside door handle being made of a conductor, the outside door handle including a slit opening in the surface and feeding points; and
   at least one of:
      a transmitter for applying a radio wave to the feeding points; and
      a receiver connected to the feeding points for receiving radio waves.

2. The door approach communication of claim 1, further including resin embedded in said slit opening.

3. The door approach communication apparatus of claim 1, further including a dielectric plate covering said slit opening.

4. The door approach communication apparatus of claim 3, wherein said dielectric plate includes at least one claw which is press-fit into said slit opening.

5. The door approach communication apparatus of claim 1, wherein said feeding points include at least two feeding points located at two respective points disposed along the length of said slit opening.

6. The door approach communication apparatus of claim 5, wherein said feeding points are laterally separated from, with respect to the length of said slit opening, a center of said slit opening.

7. The door approach communication apparatus of claim 5, wherein said feeding points include first and second laterally disposed screws, wherein said slit opening passes between said first and second laterally disposed screws.

8. The door approach communication apparatus of claim 1, further comprising a means for selecting whether said transmitter is connected to said slot antenna, or whether said receiver is connected to said slot antenna.

9. A door lock control system, comprising:
   a portable wireless device including an antenna for receiving a search radio wave, a receiver connected to the antenna for decoding a request signal carried by the search radio wave, a controller for generating a return signal in response to the request signal and a transmitter and a transmitting antenna for transmitting a return radio wave produced by modulating a carrier wave using the return signal;
   an outside door handle functioning as a slot antenna, at least the surface of the outside door handle being made of a conductor, the outside door handle including a slit opening in the surface and feeding points;
   a transmitter disposed on the vehicle for generating the search radio wave for emission by the slot antenna, said search radio wave being produced by modulating a carrier wave by the request signal to the slot antenna;
   a receiver disposed on the vehicle for decoding a return signal carried by the return radio wave, which is irradiated by the transmitting antenna of the portable wireless device; and
   a controller on the vehicle for transmitting the request signal to the transmitter on the vehicle and transmitting a lock control signal to an electrically driven door lock device on the vehicle in response to the return signal when the receiver on the vehicle decodes the return signal.

10. The door lock control system according to claim 9, wherein said slot antenna is disposed on a door handle of said vehicle.

11. The door lock control system according to claim 9, further including a receiving antenna, which is separate from said slot antenna, disposed on the vehicle, for receiving the return radio wave irradiated by the transmitting antenna of the portable wireless device.

12. The door lock control system according to claim 9, wherein said slot antenna also serves as a receiving antenna, and wherein said system further includes:
   selectively connecting means for selectively connecting either of the transmitter and the receiver on the vehicle to the slot antenna.

13. The door lock control system according to claim 9, wherein said receiver disposed on said vehicle is able to detect signals from said transmitter located on said portable wireless device over a greater distance than said receiver disposed on said wireless device is able to detect signals from said transmitter disposed on said vehicle.

14. The door lock control system according to claim 9, wherein the controller on the vehicle transmits the request signal to the transmitter on the vehicle at intervals determined by a predetermined period.

15. The door lock control system according to claim 9, wherein said transmitter of said portable wireless device also includes means for transmitting lock control signals independently of request signals transmitted by said transmitter disposed on said vehicle.

16. The system according to claim 15, wherein said controller of said vehicle also includes means for discriminating whether signals received by said vehicle receiver were transmitted by said portable wireless device in response to a request signal, or independently of said request signal.

17. The system of claim 16, wherein signals which are generated in response to a request signal include response indicia, and are discriminated from signals which are generated independently of said request signal on the basis of said indicia.

18. A method for remotely controlling a door lock mechanism of a vehicle, comprising the steps of:
   generating and transmitting, by a transmitter located on the vehicle, a search radio wave from an outside door handle that includes a slit opening and feeding points so that the outside door handle functions as a slot antenna;
   receiving said search radio wave at a portable wireless device;
   responding to said search radio wave, at said portable wireless device, by generating and transmitting a return radio wave;

receiving said return radio wave at a receiver located on the vehicle; and controlling said door lock mechanism of the vehicle on the basis of information extracted from said return radio wave.

19. The method of claim 18, further including the steps of:

generating and transmitting, by said portable wireless device, a lock control signal independently of a search radio wave generated by said transmitter at said vehicle;

receiving, by said receiver located on the vehicle, the lock control signal transmitted by said portable wireless device; and discriminating, at said vehicle, said lock control signal from said return radio wave.

20. The method of claim 19, wherein said lock control signal includes an ID code associated with said portable wireless transmitter, while said return radio wave includes both said ID code associated with said portable wireless transmitter and a response signal indicating that said portable wireless transmitter is responding to a search radio wave, wherein said vehicle discriminates between said lock control signal and said return radio wave depending on whether said response signal is present in the received signal.

* * * * *